(12) United States Patent
Mauer et al.

(10) Patent No.: US 6,365,699 B1
(45) Date of Patent: *Apr. 2, 2002

(54) CURABLE COMPOSITIONS COMPOSITE COATINGS AND PROCESS FOR HAVING IMPROVED MAR AND ABRASION RESISTANCE

(75) Inventors: George W. Mauer, Brunswick Hills; James A. Meier, Rocky River; Lynne R. Stahl, Cleveland, all of OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/471,213

(22) Filed: Dec. 23, 1999

Related U.S. Application Data

(62) Division of application No. 09/197,990, filed on Nov. 23, 1998, now abandoned, which is a division of application No. 08/888,937, filed on Jul. 7, 1997, now Pat. No. 5,891,981, which is a continuation of application No. 08/432,295, filed on May 1, 1995, now abandoned.

(51) Int. Cl.$^7$ .............................................. C08G 18/80
(52) U.S. Cl. ............................. 528/45; 528/27; 528/32; 525/101; 525/124; 428/423.1; 427/407.1
(58) Field of Search ............................. 528/27, 45, 32; 525/124, 101; 428/423.1; 427/407.1

(56) References Cited

U.S. PATENT DOCUMENTS

| | | | |
|---|---|---|---|
| 3,567,692 A | 3/1971 | Haggis et al. ................. 260/75 |
| 3,893,977 A | 7/1975 | Wingler ............. 260/755.5 TB |
| 4,102,942 A | 7/1978 | Smith et al. ................. 260/836 |
| 4,147,679 A | 4/1979 | Scriven et al. ....... 260/29.2 TN |
| 4,147,688 A | 4/1979 | Makhlouf et al. ......... 260/33.6 |
| 4,281,076 A | 7/1981 | Kamimura .................. 525/124 |
| 4,375,498 A | 3/1983 | Le Minez et al. .......... 428/416 |
| 4,403,003 A | 9/1983 | Backhouse ............... 427/407.1 |
| 4,435,559 A | 3/1984 | Valko .......................... 528/73 |
| 4,536,558 A | 8/1985 | Kordomenos ............... 528/100 |
| 4,615,779 A | 10/1986 | McCollum et al. ...... 204/181.7 |
| 4,650,718 A | 3/1987 | Simpson et al. ............ 428/413 |
| 4,681,811 A | 7/1987 | Simpson et al. ............ 428/413 |
| 4,699,814 A | 10/1987 | Ambrose et al. ......... 427/407.1 |
| 4,703,101 A | 10/1987 | Singer et al. .................. 528/87 |
| 4,708,984 A | 11/1987 | Forgione et al. ............ 525/127 |
| 4,708,985 A | 11/1987 | Diamantoglou et al. .... 525/166 |
| 4,710,542 A | 12/1987 | Forgione et al. ............ 525/127 |
| 4,732,791 A | 3/1988 | Blackburn et al. ........ 427/407.1 |
| 4,755,581 A | 7/1988 | Blackburn et al. ........... 528/93 |
| 4,764,430 A | 8/1988 | Blackburn et al. .......... 428/413 |
| 4,798,745 A | 1/1989 | Martz et al. ............. 427/407.1 |
| 4,798,746 A | 1/1989 | Claar et al. .............. 427/407.1 |
| 4,888,244 A | 12/1989 | Masubuchi et al. ......... 428/416 |
| 4,892,906 A | 1/1990 | Pham et al. ................. 524/730 |
| 4,917,955 A | 4/1990 | Porter, Jr. et al. .......... 428/413 |
| 4,927,868 A | 5/1990 | Schimmel et al. .......... 523/439 |
| 4,939,213 A | 7/1990 | Jacobs, III et al. ....... 525/329.9 |
| 5,006,653 A | 4/1991 | Forgione et al. ............ 544/196 |
| 5,066,733 A | 11/1991 | Martz et al. ................. 525/455 |
| 5,071,904 A | 12/1991 | Martin et al. ............... 525/458 |
| 5,075,370 A | 12/1991 | Kubitza et al. ............. 524/591 |

(List continued on next page.)

FOREIGN PATENT DOCUMENTS

| | | |
|---|---|---|
| CA | 1262596 | 10/1989 |
| DE | 2247696 | 9/1972 |
| EP | 0 045 040 | 2/1982 |
| EP | 0 549 643 | 7/1993 |
| EP | 0 604 922 | 7/1994 |
| EP | 0 661 091 | 7/1995 |
| EP | 0 665 252 | 8/1995 |
| FR | 2189479 | 1/1974 |
| JP | 62-87288 | 4/1987 |
| JP | 1-156374 | 6/1989 |
| JP | 3-172368 | 7/1991 |
| JP | 4-130168 | 5/1992 |
| JP | 4-318088 | 11/1992 |
| JP | 5-230318 | 9/1993 |
| JP | 6-228305 | 8/1994 |
| WO | WO92/00342 | 1/1992 |
| WO | WO96/15185 | 5/1996 |
| WO | WO96/34905 | 11/1996 |

OTHER PUBLICATIONS

English Language Abstract of Japanese Patent Document 5–230318, Sep. 1993.
English Language Abstract of Japanese Patent Document 4–318088, Nov. 1992.
English Language Abstract of Japanese Patent Document 1–156374, Jun. 1989.

Primary Examiner—Rachel Gorr
(74) Attorney, Agent, or Firm—William J. Uhl

(57) ABSTRACT

A curable composition and process of applying the composition and the resulting composite coatings provide improved resistance to acid etch and mar. The curable composition has (a) about 30 to 90 percent by weight, based on total weight of resin solids, of a film-forming composition selected from the group consisting of:

(i) a polyepoxide and a polyacid crosslinking agent;

(ii) an acrylosilane polymer, an acrylic polyol polymer, and optionally an alkylated melamine-formaldehyde crosslinking agent; and (iii) a polyisocyanate and a polymer having at least one group that is reactive with isocyanate; and (b) about 10 to 70 percent by weight, based on total weight of resin solids, of a tricarbamoyl triazine compound of the formula: $C_3N_3(NHCOXR)_3$ wherein X is nitrogen, oxygen, sulfur, phosphorus, or carbon, and R is a lower alkyl group having 1 to 12 carbon atoms, or mixtures of lower alkyl groups. The process involves applying the curable coating as a monocoat on a cured primer surfacer coating on a substrate or as a clear coat on a curable base coat that are cured separately or conjointly. The composite coating includes the primer surfacer and monocoat on a substrate or the color-plus-clear coating on an electrodeposited coating layer or a primer surfacer coating layer.

16 Claims, No Drawings

U.S. PATENT DOCUMENTS

| | | | |
|---|---|---|---|
| 5,084,541 A | 1/1992 | Jacobs, III et al. | 528/45 |
| 5,089,561 A | 2/1992 | Forgione et al. | 525/127 |
| 5,089,617 A | 2/1992 | Forgione et al. | 525/196 |
| 5,137,972 A | 8/1992 | Cook | 525/123 |
| 5,175,201 A | 12/1992 | Forgione et al. | 524/257 |
| 5,182,355 A | 1/1993 | Martz et al. | 528/75 |
| 5,187,199 A | 2/1993 | Sudo | 523/523 |
| 5,214,086 A | 5/1993 | Mormile et al. | 524/237 |
| 5,239,012 A | 8/1993 | McEntire et al. | 525/327.7 |
| 5,250,605 A * | 10/1993 | Hazen et al. | 524/504 |
| 5,256,452 A | 10/1993 | McMonigal | 427/407 |
| 5,279,862 A | 1/1994 | Corcoran et al. | 427/407 |
| 5,294,671 A | 3/1994 | Szita et al. | 525/187 |
| 5,314,953 A | 5/1994 | Corcoran et al. | 525/123 |
| 5,342,888 A | 8/1994 | Sudo | 525/124 |
| 5,346,947 A | 9/1994 | Guerro et al. | 524/591 |
| 5,352,755 A | 10/1994 | Hughes | 528/45 |
| 5,356,973 A | 10/1994 | Taljan et al. | 524/314 |
| 5,359,014 A | 10/1994 | Forgione et al. | 525/455 |
| 5,369,153 A | 11/1994 | Barsotti et al. | 523/429 |
| 5,384,367 A | 1/1995 | Swarup et al. | 525/169 |
| 5,401,790 A | 3/1995 | Poole et al. | 524/199 |
| 5,565,243 A | 10/1996 | Mauer et al. | 427/408 |
| 5,574,103 A | 11/1996 | Wu et al. | 525/127 |
| 5,593,735 A | 1/1997 | Levine et al. | 260/18 PF |
| 5,965,272 A * | 10/1999 | Donnelly et al. | 428/447 |

* cited by examiner

CURABLE COMPOSITIONS COMPOSITE COATINGS AND PROCESS FOR HAVING IMPROVED MAR AND ABRASION RESISTANCE

This is a divisional of U.S. patent application Ser. No. 09/197,990, filed Nov. 23, 1998, abandoned, which is a divisional of U.S. patent application Ser. No. 08/888,937 U.S. Pat. No. 5,891,981, issued Apr. 6, 1999, which is a continuation of U.S. patent application Ser. No. 08/432,295, filed May 1, 1995, now abandoned.

BACKGROUND OF THE INVENTION

The present invention relates to curable compositions and composite coatings on substrates containing tricarbamoyl triazines and process for applying the composition for mar and abrasion resistance.

Of increasing concern in many geographic areas is the encounter with acidic precipitation. Coatings, particularly automotive original equipment coatings, that are resistant to such environmental conditions like those that are resistant to etching by atmospheric acid precipitation ("acid etch resistance") are becoming increasingly desirable. Original equipment manufacturers are requiring that coating systems demonstrate acid etch resistance.

In addition to the requirement of acid etch resistance, original equipment coatings must also demonstrate mar and abrasion resistance; i.e., the appearance of the coating must not be detrimentally affected when the coating is contacted with an abrasive material. Mar and abrasion resistance is a desirable property particularly due to the popularity of commercial car washes where brushes are often used to wash car bodies.

A number of commercial coating systems which demonstrate acid etch resistance do not provide adequate mar and abrasion resistance. Microparticulate materials such as silica, metal sulfides, and crosslinked styrene-butadiene have been added to these coating systems to improve mar resistance, but gloss and distinctness of image of the systems are adversely affected due to light scattering at the particle surfaces.

Recently, curing agents for coatings with active hydrogen-containing materials have been developed that are triisocyanato or tricarbamoyl triazines as shown in U.S. Pat. Nos. 4,930,213 and 5,084,541. The U.S. Pat. No. 4,939,213 ('213) patent shows the use of these curing agents in a coating composition to improve environmental resistance for powder coatings, coil coatings and can coatings. As noted on page 1 of the '213 patent, when the active hydrogen-containing compounds are hydroxylated polymers, environmentally-resistant coatings are provided.

It would be desirable to provide a curable composition for use as a coating which avoids the marring problems of the prior art coating systems while maintaining excellent acid etch resistance and appearance properties.

SUMMARY OF THE INVENTION

In accordance with the present invention, a curable composition, which is capable of exhibiting improved mar and acid etch resistance, is provided which comprises (a) about 30 to 90 percent by weight, based on total weight of resin solids, of a film-forming composition comprising:

(i) an acrylosilane polymer, an acrylic polyol polymer, and optionally an alkylated melamine-formaldehyde crosslinking agent; and (b) about 10 to 70 percent by weight, based on total weight of resin solids, of a tricarbamoyl triazine compound of the formula: $C_3N_3(NHCOXR)_3$, wherein X is nitrogen, oxygen, sulfur, phosphorus, or carbon, and R is a lower alkyl group having 1 to 12 carbon atoms, or mixtures of lower alkyl groups.

The process of the present invention and the composite coating involve applying a first coating as a primer surfacer coating layer to a substrate, curing the primer surfacer layer, and applying a second or an additional coating layer which is the aforedescribed tricarbamoyl triazine compound containing curable coating composition, and curing this coating.

The invention also provides a process for applying a color-plus-clear composite coating to a substrate comprising applying to the substrate a pigmented or colored first curable coating composition to form a base coat and applying to the base coat a second curable coating composition which is transparent to form a clear coat over the base coat. The clear coat can be the curable composition of the present invention.

DETAILED DESCRIPTION

In the following description, reference to number average and weight average molecular weights refers to measurements determined by gel permeation chromatography using a polystyrene standard as is well known to those skilled in the art. Where ranges of amounts are stated in percentages for components that are combined to yield a composition, the amount of each of those various components yielding the composition are generally selected from each range for that component so that the total amount of the components in the composition equals around 100 percent.

In the curable composition of the present invention, the aforedescribed film-forming compositions each is capable of film formation with crosslinking. Crosslinking can be through the one or more designated polymeric materials with the crosslinking material. For the film-forming compositions with the additional polymeric material or with two polymeric materials that are reactive with each other, the additional polymeric material and/or the inter-reactivity of both polymers results in crosslinking. The polyepoxide and a polyacid film-forming composition has the polyacid that is used as the crosslinking agent since the polyepoxide is the major component of the film. For the film-forming composition of the acrylosilane polymer and the acrylic polyol polymer, these polymeric materials have functionality so that one reacts to form crosslinks with the other along with any alkylated melamine-formaldehyde crosslinking agent. This occurs in a similar manner in the film-forming composition of polyisocyanate and a polymer having at least one group that is reactive with isocyanate. It is believed without limiting the present invention that the tricarbamoyl triazine compound is a crosslinking agent that also provides crosslinking in addition or further to that of the aforementioned film-forming compositions.

The film-forming composition in the curable composition of the present invention preferably comprises a mixture of a polyepoxide and a polyacid crosslinking agent. Preferably, the polyepoxide is present in the film-forming composition (i) in amounts of about 10 to 90, more preferably from about 25 to 50 percent by weight based on total weight of resin solids in the film-forming composition (i). Preferably, the polyepoxides have a glass transition temperature (Tg) less than 50° C., more preferably less than 30° C. The Tg is described in *PRINCIPLES OF POLYMER CHEMISTRY*, Flory, Cornell University Press, Ithaca, N.Y., 1953, pages 52–57. The Tg can be calculated as described by Fox in *Bull. Amer. Physic. Society*, 1,3, page 123 (1956). The Tg can be measured experimentally by using a penetrometer such as a DuPont 940 Thermomedian Analyzer. The Tg of the polymers as used herein refers to the calculated values unless otherwise indicated.

Among the polyepoxides which can be used are epoxy-containing acrylic polymers which are preferred, epoxy condensation polymers such as polyglycidyl ethers of alcohols and certain polyepoxide monomers and oligomers. Epoxy-containing acrylic polymers are preferred because they yield products which have the optimum combination of coating properties; i.e., smoothness, gloss, durability, and solvent resistance. The epoxy-containing acrylic polymer is a copolymer of an ethylenically unsaturated monomer having at least one epoxy group and at least one polymerizable ethylenically unsaturated monomer which is free of epoxy groups. The preparation of the epoxy-containing acrylic polymer may be conducted as disclosed in U.S. Pat. No. 4,650,718, incorporated herein by reference. The epoxy-containing acrylic polymer typically has a number average molecular weight between about 1000 and 20,000, preferably about 1000 to 10,000, and more preferably about 1000 to 5000.

The ethylenically unsaturated monomers useful in preparing the epoxy-containing acrylic polymer can be selected from numerous art-recognized monomers such as the below-described nonexclusive examples. Examples of ethylenically unsaturated monomers containing epoxy groups are those containing 1,2-epoxy groups and include glycidyl acrylate, glycidyl methacrylate, and allyl glycidyl ether. Examples of ethylenically unsaturated monomers which do not contain epoxy groups are vinyl monomers and alkyl esters of acrylic and methacrylic acid containing from 1 to 20 atoms in the alkyl group such as those art-recognized monomers disclosed in U.S. Pat. No. 4,650,718, incorporated herein by reference.

The epoxy group-containing ethylenically unsaturated monomer is preferably used in amounts of from about 10 to 65, more preferably from 20 to 50 percent by weight of the total monomers used in preparing the epoxy-containing acrylic polymer. Of the remaining polymerizable ethylenically unsaturated monomers, preferably from 35 to 90 percent, more preferably from 50 to 80 percent by weight of the total monomers are the alkyl esters of acrylic and methacrylic acid containing from 1 to 20 carbon atoms in the alkyl group, and about 0 to 50 percent, preferably from about 5 to 40 percent based on weight of total monomers are other ethylenically unsaturated monomers; i.e., the vinyl aromatic compounds, nitriles, vinyl and vinylidene halides and vinyl esters.

The epoxy condensation polymers which may be used are polyepoxides; that is, those having a 1,2-epoxy equivalency greater than 1, preferably greater than about 1 and up to about 3. The preferred polyepoxides are polyglycidyl ethers of aliphatic alcohols. These polyepoxides can be produced by etherification of alcohols, such as those known in the art and described in U.S. Pat. No. 4,650,718, with an epihalohydrin or dihalohydrin such as epichlorohydrin or dichlorohydrin in the presence of alkali.

In addition to the epoxy-containing acrylic polymers and epoxy condensation polymers described above, certain polyepoxide monomers and oligomers can also be used. Examples of these materials are described in U.S. Pat. No. 4,102,942 in column 3, lines 1–16, incorporated herein by reference. Specific examples of such low molecular weight polyepoxides are 3,4-epoxycyclohexylmethyl 3,4-epoxycyclohexane-carboxylate and bis( 3,4-epoxycyclohexylmethyl) adipate. These low molecular weight polyepoxides may be used to increase the cure response and solids content of the curable compositions. When used, they are present in amounts up to 30 percent by weight based on the total weight of resin solids in the crosslinkable composition.

The film-forming composition (i) in the curable composition of the present invention further includes a polyacid crosslinking agent present in the film-forming composition in amounts of about 10 to 90, preferably 25 to 75 percent by weight based on total weight of resin solids in the film-forming composition. The polyacid crosslinking agent has a high average acid functionality. More specifically, the polyacid crosslinking agent on average contains more than two acid groups per molecule, more preferably three or more, and most preferably four or more, such acid groups being reactive with the polyepoxide to form a crosslinked coating as indicated by its resistance to organic solvent. The parameter of greater than two acid groups per molecule is intended to encompass mixtures of polyacid crosslinking agents in which di-functional curing agents are mixed with tri- or higher functionality polyacid crosslinking agents. Polyacid crosslinking agent mixtures including up to about 50 percent of a di-functional curing agent with a tri-functional curing agent are suitable. Higher percentages of di-functional material can be used if the remainder of the curing agent mixture is higher than tri-functional or if the polyacid crosslinking agent mixture is used with a highly functional polyepoxide component. The acid functionality is preferably carboxylic acid, although acids such as phosphorus-based acid may be used. Preferably, the polyacid crosslinking agent is a carboxylic acid terminated material having, on average, greater than two carboxylic acid groups per molecule. Among the polyacid crosslinking agents which may be used are carboxylic acid group-containing polymers such as acrylic polymers, polyesters, and polyurethanes; oligomers such as ester group-containing oligomers, which are preferred; and monomers. Suitable art-recognized polyacid crosslinking agents include those described in U.S. Pat. Nos. 4,650,718; 4,681,811; and 4,703,101, incorporated herein by reference.

The equivalent ratio of the reactants present in the film-forming composition (i) is adjusted such that for each equivalent of epoxy there are around 0.3 to around 3.0, preferably 0.75 to 1.5 equivalents of carboxyl (anhydride, if present, is considered monofunctional).

The film-forming composition (i) may also contain additional materials as known to those skilled in the art. For example, an anhydride for improved cure response and copolymer of an alpha olefin and olefinically unsaturated anhydride for improved humidity resistance of the cured coating can be used. The anhydrides are preferably liquids at 25° C. Examples of suitable anhydrides include dodecenyl succinic anhydride and alkyl-substituted hexahydrophthalic anhydrides wherein the alkyl group contains up to 7 carbon atoms, more preferably up to 4 carbon atoms, such as methyl hexahydrophthalic anhydride. The amount of the anhydride which is used in the curable composition can vary from about 0 to 40 percent, preferably from about 5 to 25 percent by weight based on total weight of resin solids of the film-forming composition. An example of the copolymer is one of 1-octene or 1-decene and maleic anhydride. Further art-recognized materials and their amounts are described more fully in U.S. Pat. No. 4,927,868, incorporated herein by reference.

To form one-package compositions, the film-forming composition (i) in the curable composition of the present invention is substantially free of basic esterification catalyst.

The high functionality associated with the polyepoxide and polyacid provide for sufficient cure response. Although the absence of catalyst may have a negative effect on the cure of the composition, it provides for a stable composition and is also beneficial in reducing or eliminating cure inhibition between layers in a color-plus-clear formulation when the base coat contains an acid-catalyzed resinous binder. As is known in the art, properties of multilayered composite coatings can be deleteriously affected by different cure chemistries between coating layers which interfere with each other; e.g., an acid-catalyzed base coat and a base-catalyzed clear coat. In a preferred embodiment, the film-forming composition (i) of the present invention has no or only small amounts of basic esterification catalyst such that the composition is stable for a time sufficient to allow formulation of the composition as a single component; i.e., one-package composition.

To form multi-package or multi-component compositions in which the polyepoxide and polyacid crosslinking agent are present in separate packages and combined shortly before application, an esterification catalyst to promote cure can be included in the film-forming composition (i). A number of such catalysts are known in the art. These catalysts include basic materials such as secondary amine catalysts, for example, piperidine; tertiary amine catalysts such as N,N-dimethyldodecylamine, pyridine, and N,N-dimethylaniline; ammonium compounds, including tetrabutylammonium bromide, tetrabutylammonium hydroxide, and tetrabutylammonium acetate; phosphonium compounds, including ethyltriphenylphosphonium acetate and tetrabutyl phosphonium bromide; and other ammonium and phosphonium salts.

In another embodiment of the invention, the film-forming composition (ii) in the curable composition of the present invention comprises an acrylosilane polymer, an acrylic polyol polymer, and optionally an alkylated melamine-formaldehyde crosslinking agent.

The acrylosilane polymer is prepared by polymerizing about 40 to 95 percent by weight ethylenically unsaturated non-silane containing monomers, and about 5 to 60 percent by weight ethylenically unsaturated alkoxy or acyloxy silane monomers, based on the weight of the acrylosilane. Suitable ethylenically unsaturated non-silane containing monomers include alkyl and aryl acrylates and methacrylates having 1 to 12 carbon atoms in the alkyl or aryl groups as are known to those skilled in the art. The alkyl groups also may be cycloaliphatic. Other suitable ethylenically unsaturated non-silane containing monomers include styrene, methyl styrene, acrylamide, acrylonitrile, and the like, and non-interfering mixtures thereof; i.e., mixtures which do not interfere with any crosslinking mechanisms of the film-forming composition. Suitable ethylenically unsaturated alkoxy or acyloxy silane monomers include acrylatoalkoxy silanes, methacrylatoalkoxy silanes vinylalkoxy silanes, and acyloxy silanes such as acrylatoxy silane, methacrylatoxy silane, and vinylacetoxy silanes, and non-interfering mixtures thereof.

The acrylosilane polymer typically has a weight average molecular weight of about 1,000 to 30,000 and a number average molecular weight of about 500 to 6,000. One or more of these types of acrylosilane polymers are present in the film-forming composition (ii) in amounts of about 10 to 90 percent by weight based on total weight of resin solids in the film-forming composition (ii).

The film-forming composition (ii) further includes an acrylic polyol polymer present in the film-forming composition in amounts of about 10 to 90 percent by weight based on total weight of resin solids in the film-forming composition (ii). The acrylic polyol polymer preferably has 10 a hydroxyl number of about 50 to 200, and a weight average molecular weight of about 1,000 to 200,000, preferably about 1,000 to 20,000. The hydroxyl number can be determined by any art-recognized method such as by theoretical calculation or by analytical methods.

The acrylic polyol polymer is prepared by polymerizing one or more hydroxyl functional alkyl acrylate or methacrylate monomers and up to about 80 percent by weight ethylenically unsaturated non-hydroxyl functional monomers, based on the weight of the acrylic polyol. Suitable hydroxyl functional alkyl acrylate or methacrylate monomers include hydroxy ethyl acrylate and methacrylate, hydroxypropyl acrylate and methacrylate, hydroxybutyl acrylate and methacrylate, and the like. Suitable ethylenically unsaturated non-hydroxyl functional monomers include alkyl and aryl acrylates and methacrylates having 1 to 16 carbon atoms in the alkyl or aryl groups as are known to those skilled in the art. Other suitable ethylenically unsaturated non-hydroxyl functional monomers include styrene, methyl styrene, acrylamide, acrylonitrile, and the like.

The film-forming composition (ii) containing the acrylosilane polymer and acrylic polyol polymer may further include an alkylated melamine-formaldehyde crosslinking agent present in the film-forming composition in amounts of up to about 50 percent by weight based on total weight of resin solids in the film-forming composition (ii).

The melamine-formaldehyde crosslinking agent may be monomeric or polymeric and may be partially or fully alkylated. This crosslinking agent typically has a weight average molecular weight of about 500 to 1500, and a number average molecular weight of about 300 to 600. Suitable crosslinking agents include CYMEL 1168, CYMEL 1161, and CYMEL 1158, all available from CYTEC Industries, Inc., Five Garret Mountain Plaza, West Paterson, N.J. 07424, and RESIMENE 755 and RESIMENE 4514, available from Monsanto Chemical Co.

In another embodiment of the invention, the film-forming composition (iii) in the curable composition of the present invention is a composition which may be single- or multi-package comprising a polyisocyanate or isocyanate functional resin or polymer and a polymer having at least one group that is reactive with isocyanate. The film-forming composition may further include active hydrogen containing reactive diluents as are known to those skilled in the art.

Polyisocyanate may be aliphatic, cycloaliphatic, or heterocyclic and may be unsubstituted or substituted. These can range from the simple isocyanates such as isophorone diisocyanate, trimethylhexamethylene diisocyanate, dicyclohexylmethane diisocyanate to more elaborate isocyanurates. Examples of the latter include the isocyanurate available from Mobay Chemical, now Miles or Bayer U.S.A., as "Des N-3390"; isocyanurate derived from isophorone diisocyanate, commercially available from VEBA Company as T1890. Also, biurets such as the biuret from 1,6-hexamethylene diisocyanate, commercially available from Mobay Chemical, now Miles or Bayer U.S.A., as DESMODUR N, mixtures of polyisocyanates and monoisocyanates, isocyanate prepolymers, and mixtures of organic isocyanate prepolymers with monomeric isocyanates (so-called semi-prepolymers) may be utilized as the polyisocyanate. The isocyanate prepolymers can be prepared by any method known to those skilled in the art such as those along with further examples of the polyisocyanates as shown in U.S.

Pat. No. 4,798,746 (Claar, et al.); U.S. Pat. No. 4,798,745 (Martz, et al.); U.S. Pat. No. 4,699,814 (Ambrose, et al.); U.S. Pat. No. 3,567,692 (Haggis et al.) and Canadian patent document 1262596, all hereby incorporated by reference.

The polyisocyanate is preferably a fully-capped polyisocyanate with substantially no free isocyanate groups. The polyisocyanate is preferably aliphatic. Diisocyanates are preferred, although higher polyisocyanates can be used in place of or in combination with diisocyanates. Examples of suitable aliphatic diisocyanates are straight chain aliphatic diisocyanates such as 1,4-tetramethylene diisocyanate and 1,6-hexamethylene diisocyanate, and isocyanurates thereof. Also, cycloaliphatic diisocyanates can be employed. Examples include isophorone diisocyanate, isocyanurates of isophorone diisocyanate, and 4,4'-methylene-bis-(cyclohexyl isocyanate), and Metaxylylene diisocyanate. Suitable capping agents include those well known in the art such as pyrazoles as those described in U.S. Pat. No. 5,352,755, alcohols, lactams, oximes (which are preferred), malonic esters, phenols, amines, and the like.

The polyisocyanate is present in the film-forming composition (iii) in amounts of about 10 to 60 percent by weight, preferably 15 to 40 percent by weight based on total weight of resin solids in the film-forming composition (iii).

Suitable polymers having at least one group that is reactive with isocyanate include those having hydroxyl groups, amino groups, thiol groups, hydrazide groups, and the like. Preferably, the reactive group is hydroxyl. The polymer may be an acrylic, polyester, polyepoxide, polycarbonate, polyurethane, polyamide, polyimide, polysiloxane, acrylic polyols; polyester polyols; polyether polyols; amide-containing polyols; epoxy polyols; polyhydric polyvinyl alcohols; cellulose and derivatives thereof, urethane polyols; and mixtures thereof.

The polymer is preferably an acrylic. The polymer is present in the film-forming composition in amounts of about 40 to 90 percent by weight, preferably 60 to 85 percent by weight based on total weight of resin solids in the clear coat composition.

For instance, one such suitable film-forming composition for (iii) is a reaction product of uncapped or partially or completely capped, preferably uncapped, polyisocyanates which contain isocyanurate groups and may or may not contain biuret groups, have a functionality of from 2.5 to 6, preferably from 3 to 5, and possess predominantly cycloaliphatically bonded isocyanate groups, with, as a polyol mixture, hydroxyl-containing polyacrylates of specific composition and polyesterols which are soluble in organic solvents. In this case the reaction product can be of a first mixture of (1) a polyhydroxypolyacrylate resin obtained from esters of acrylic acid and/or methacrylic acid with monofunctional aliphatic alcohols, monoesters of acrylic acid and/or methacrylic acid with polyfunctional aliphatic alcohols and other copolymerizable olefinically unsaturated monomers, and (2) a polyesterpolyol which is soluble in organic solvents with a polyisocyanate which is uncapped or partially or completely capped and contains isocyanurate groups and may or may not contain biuret groups and has a functionality of from 2.5 to 6. Other formulations known to those skilled in the art for film-forming composition (iii) can also be used, and these formulations can be those referred to as two-pack isocyanate coating formulations.

The tricarbamoyl triazine compound in the curable composition of the present invention has the formula $C_3N_3(NHCOXR)_3$, wherein X is nitrogen, oxygen, sulfur, phosphorus, or carbon, and R is a lower alkyl group having 1 to 12 carbon atoms, or mixtures of lower alkyl groups. The X moiety is preferably oxygen or carbon, more preferably oxygen. The R moiety preferably has one to eight carbon atoms, for example, methyl, ethyl, n-propyl, i-propyl, butyl, n-octyl, 2-ethylhexyl, and R is preferably a mixture of methyl and butyl groups. Such compounds and the preparation thereof are described in detail in U.S. Pat. No. 5,084,541, incorporated herein by reference. For convenience, these compounds in the remaining portion of this disclosure may be referred to as "TACT". These compounds are not aminoplasts, which are condensates obtained from the reaction of an aldehyde such as formaldehyde, such as acetaldehyde, crotonaldehyde, and benzaldehyde with an amine or amide such as melamine, urea, or benzoguanamine.

The tricarbamoyl triazine compound in the curable composition of the present invention is present in amounts of about 10 percent to 70 percent by weight, more preferably from about 10 to 40 percent by weight, based on total weight of resin solids in the curable composition. It may be added to the film-forming composition neat, that is, added by itself or in other resinous ingredients, or with solvents or other diluents. In the case of a multi-pack film-forming composition, the tricarbamoyl triazine may be mixed with either component before application of the composition to a substrate.

Though not intending to be bound by theory, it is believed that the tricarbamoyl triazine compound in the curable composition of the present invention reacts with active hydrogens such as hydroxyl, carboxyl, amido, primary and secondary amino, thiol, and the like, present in or generated during cure in the film-forming composition, thereby "co-curing" or post-curing in the composition.

Other optional ingredients, such as plasticizers, catalysts, anti-oxidants, hindered amine light stabilizers, UV light absorbers and stabilizers may be formulated into the curable compositions of the present invention. When used in a manner as is known to those skilled in the art, one can appreciate that these ingredients are present (on an individual basis) in amounts up to 10 percent, preferably from about 0.1 to 5 percent by weight based on total weight of resin solids of the curable composition. Organic and inorganic pigments, including metallic pigments such as those disclosed below with respect to base coats may also be formulated into the curable compositions of the present invention in art-recognized amounts.

The curable compositions preferably are formulated into liquid high solids coating compositions, that is, compositions containing greater than 40 percent, preferably greater than 50 percent by weight resin solids. The solids content is determined by heating a sample of the composition to 105–110° C. for 1–2 hours to drive off the volatile material and measuring relative weight loss. Although the compositions are preferably liquid coating compositions, they may be formulated as powder coating compositions.

The curable compositions of the invention may be applied to a substrate by any conventional coating technique such as brushing, spraying, dipping or flowing, but spray applications are preferred because of superior gloss. Any of the known spraying techniques may be employed such as compressed air spraying, electrostatic spraying and either manual or automatic methods.

After application of the coating composition to the substrate, the coated substrate is heated to cure the coating. In the curing operation, solvents are driven off and the film-forming materials of the coating composition are crosslinked. The heating or curing operation is usually carried out at a temperature in the range of from 160–350° F. (71–177° C.) but if needed lower or higher temperatures may be used as necessary to activate crosslinking mechanisms. The thickness of the coating is usually from about 0.5–5 mils (12.7–127 microns), preferably 1.2–3 mils (30.5–76.2 microns).

Preferably, the compositions of the present invention are used to formulate clear coats for use in a color-plus-clear application. In a color-plus-clear application, a composite coating is applied to a substrate. The process comprises applying to the substrate a pigmented or colored film-forming composition to form a base coat and applying to the base coat a second film-forming composition to form a transparent clear coat, usually the top coat over the base coat.

The clear film-forming composition which forms the transparent coat which is usually the top coat is a curable coating composition comprising the film-forming composition of (i) or (ii) of (iii) and the TACT material. The application of the clear coat may vary slightly depending on the type of film-forming composition that is used. Generally, the process includes applying to the substrate the pigmented or colored film-forming composition to form a base coat and applying to the base coat curable coating composition to form a transparent top coat, or clear coat, over the base coat. The clear top coat composition is applied to the base coat by any of the conventional coating techniques mentioned above, with spray applications preferred. Typically, the clear coat is applied to the base coat via a wet-on-wet technique before the base coat has been cured. The two coatings are then heated to conjointly cure both coating layers. Curing conditions such as described above may be used.

In a particularly preferred embodiment, additional coating layers such as a primer and/or a primer-surfacer may be applied to the substrate prior to application of the composition of the present invention, or when the composition of the present invention is used as a clear coat in a color-plus-clear application, additional coating layers such as a primer and/or a primer-surfacer may be applied to the substrate prior to application of the base coat.

Suitable primers and primer-surfacers include electrodepositable and spray applied primers, as are known to those skilled in the art. Examples of suitable primers include several available from PPG Industries, Inc., as DPX-1791, DPX-1804, DSPX-1537, and GPXH-5379.

The "primer surfacer", which is a primer composition for use under a subsequently applied topcoating composition includes such materials as thermoplastic and/or crosslinking (e.g., thermosetting) film-forming resins generally known in the art of organic coating compositions. The term "thermosetting" is intended to include those that are capable of crosslinking either with or without the application of heat. These include thermoplastic resins and/or thermosetting resins generally known as cellulosics, acrylics, aminoplasts, urethanes, polyesters, epoxies and polyamides, all as further described in U.S. Pat. No. 5,066,733 (Martz, et al.). These resins, when desired, may also contain functional groups characteristic of more than one class, as for example, polyester amides, uralkyds, urethane acrylates, urethane amide acrylates, and the like.

As is described in U.S. Pat. No. 5,356,973, incorporated herein, the spray applied primer surfacer can be applied to the electrocoat before topcoating. For example, substrates such as panels can be electrocoated with ED-11 electrodepositable coating from PPG Industries Inc. and can be primed with a commercially available PPG European primer surfacer coded E 730G305. This primer surfacer can be cured for 25 minutes at 329° F. (165° C.). Another example of a suitable primer surfacer can be the two-package, acrylic urethane primer surfacer known as K200/K201 more fully disclosed in U.S. Pat. No. 5,239,012 (McEntire, et al.) and U.S. Pat. No. 5,182,355, incorporated herein for such primer surfacer. This primer is preferably sanded with No. 400 grit paper and sealed with DP-40/401, which is a two-component epoxy primer which was reduced 100 percent by volume with a thinner, DTU 800. The K200/K201, DP-40/401 and DTU 800, all as available from PPG Industries, Inc.

An additional primer-surfacer is that available from PPG Industries, Inc. as E-5584. It is reducible with 2-butoxyethylacetate to a viscosity of 23 seconds as measured with a No. 4 Ford cup. This primer surfacer can be sprayed automatically and cured by flashing at ambient conditions for 15 minutes followed by heating for around 30 minutes at around 325° F. (165° C.) to produce coatings that can have dry film thickness of around 30 microns. The cured film is preferably sanded smooth with 500 grit sandpaper. Useful automatic spraying for both the primer surfacer and the clear coat is the SPRAYMATION 310160 Automatic Test Panel Spray Unit available from SPRAYMATION Inc. The useable spray gun is a Binks Model 610, with open gun pressure 60 psi (4.22 kg/cm<2>) and traverse speed of around 80 rpm.

Another suitable primer surfacer can be the water dispersed primer-surfacer composition with a combination of three essential resinous film-forming or binder ingredients as disclosed in U.S. Pat. No. 4,303,581 (Levine, et al.), herein incorporated. The primer surfacer has a) 50 to 90 percent of a high molecular addition copolymer of a styrenic monomer with acrylic monomers in latex form, b) about 5 to 40 percent of a water soluble epoxy ester resin, and c) about 5 to 20 percent of at least one water soluble or water dispersible aminoplast resin. All percents are based on percent by weight of the total of the binder ingredients.

With the use of an electrocoating composition such as that of U.S. Pat. No. 4,615,779 (McCollum, et al.), hereby incorporated, which is capable of providing a smooth coating on substrates, the presence of an intermediate coating primer surfacer (often sanded) can be avoided. Such an electrocoat is available commercially as UNIPRIME® from PPG Industries, Inc.

The film-forming composition of the base coat can be any of the compositions useful in coatings applications, particularly automotive applications. The film-forming composition comprises a resinous binder and a pigment to act as the colorant. Particularly useful resinous binders are acrylic polymers, polyesters, including alkyds, and polyurethanes, which are described in detail in U.S. Pat. Nos. 4,650,718 and U.S. Pat. No. 5,066,733 (Martz, et. al) as the second organic coating, both of which are incorporated herein by reference.

The base coats have polymers as resinous binders that can be organic solvent-based polymers, although acrylic polymers can be prepared via aqueous emulsion polymerization techniques and used as aqueous-based base coat compositions. Also, water-based base coats in color-plus-clear compositions are disclosed in U.S. Pat. No. 4,403,003, incorporated herein by reference, and the resinous compositions used in preparing these base coats can be used in the practice of this invention. Also, water-based polyurethanes such as those prepared in accordance with U.S. Pat. No. 4,147,679, incorporated herein by reference, can be used as the resinous binder in the base coat. Further, water-based coatings such as those described in U.S. Pat. No. 5,071,904, incorporated herein by reference, can be used as the base coat.

The base coat also contains pigments and other additional components traditionally used in base coat formulations. Useful pigments to give color to the base coat include metallic or non-metallic pigments. The use of metallic flake pigmentation yield the so-called "glamour metallic" finishes, intended most often for the surface of automobile bodies. Further nonexclusive examples of the pigments and other additives including their types, amounts, and proper use that are useful in the base coat are given in U.S. Pat. No. 5,401,790 (Poole, et al.); U.S. Pat. No. 5,384,367 (swarup, et al.); and U.S. Pat. No. 5,256,452. It is preferred that the base coat have at least one or more pigments, where metallic pigments can be aluminum flake, copper bronze flake or mica, and non-metallic pigment can be inorganic pigments such as titanium dioxide, iron oxide, chromium oxide, lead chromate, and carbon black, or organic pigments such as phthalocyanine blue and phthalocyanine green. In general, the pigment is incorporated into the coating composition in amounts of about 1 to 80 percent by weight based on weight of coating solids, where up to 60 percent gives better results. The metallic pigment is employed in amounts of about 0.5 to 25 percent by weight based on weight of coating solids.

As mentioned in the afore-incorporated patents, the various additional components that are well known in the art can include surfactants, UV stabilizers, flow control agents, thixotropic agents, fillers, anti-gassing agents, organic cosolvents, catalysts, and other customary auxiliaries. These materials can constitute up to 40 percent by weight of the total weight of the coating composition.

The base coating compositions can be applied to various substrates to which they adhere. The compositions can be applied by conventional means including brushing, dipping, flow coating, spraying and the like, but they are most often applied by spraying. The usual spray techniques and equipment for air spraying and electrostatic spraying by either manual or automatic methods can be used. Examples of these substrates are wood, metals, glass, cloth plastic, foam, including elastomeric substrates and the like. The base coats are particularly useful in applications over metals and elastomeric substrates that are found on motor vehicles.

During application of the base coat composition to the substrate, a film of the base coat is formed on the substrate. Typically, the base coat thickness will be about 0.01 to 5, preferably 0.1 to 2 mils in thickness. The film is formed after application by driving solvent, i.e., organic solvent or water, out of the base coat film by heating or by an air drying period. Preferably, the heating will only be sufficient for a short period of time to ensure that the clearcoat can be applied to the base coat without the former dissolving the base coat composition. Suitable drying conditions will depend on the particular base coat composition and on the ambient humidity with certain water-based compositions, but in general a drying time of from about 1 to 5 minutes at a temperature of about 80–250° F. (20–121° C.) will be adequate to ensure that mixing of the two coats is minimized. At the same time, the base coat film is adequately wetted by the topcoat composition so that satisfactory intercoat adhesion is obtained. Also, more than one base coat and multiple clear coats may be applied to develop the optimum appearance. Usually between coats, the previously applied coat is flashed that is, exposed to ambient conditions for about 1 to 20 minutes.

The curable composition of the present invention as the clear coat composition, which is preferably the topcoat, is applied to the base coat by any of the conventional coating techniques mentioned above, with spray applications preferred. Typically, the clear top coat is applied to the base coat via a wet-on-wet technique before the base coat has been cured. The two coatings are then heated to conjointly cure both coating layers. Curing conditions such as described above may be used. The preferred curable composition of the present invention is where the film-forming composition is (i) the polyepoxide and a polyacid crosslinking agent used with the TACT in the aforementioned preferred amounts.

The curable compositions of the present invention may be used as monocoats or as a component of a composite coating and have excellent etch resistance properties. The monocoat is any topcoat which can be pigmented or unpigmented that is on top of a previous primer type of coating. As used herein, the term "etch resistance" refers to the ability of a cured composition to resist etching by acids and water spotting. Etch resistance is typically evaluated by visual inspection of coated substrates after actual or simulated weathering. It should be noted that simulated weathering typically, but not always, corresponds to actual weathering. Moreover, it should be noted that cured compositions may have different etch resistance properties when subjected to actual weathering in different geographic locations. An etch resistant composition, as discussed herein, refers to a composition which has etch resistant properties under actual weathering in at least one geographic site or which has etch resistant properties under simulated weathering. In addition to the acid etch properties, the curable compositions of the present invention also can have good mar or abrasion resistance properties, evaluated by measuring the gloss of coated substrates before and after abrading of the coated substrates using a consistent laboratory method. To improve total performance even further, the primer surfacer coating can be used in a composite coating with the curable composition of the present invention, alone or in a color-plus-clear coating composite, on the substrate.

The invention will further be described by reference to the following examples. Unless otherwise indicated, all parts are by weight.

EXAMPLES 1 THROUGH 4

Examples 1 through 4 illustrate the preparation of various coating compositions in accordance with the present invention which are used in a color-plus-clear composite coating process. Example 1 is a control two-component clear coat containing polyisocyanates and an acrylic polyol. Example 2 illustrates the preparation of a clear coat containing a tricarbamoyl triazine compound in place of one of the polyisocyanates. Example 3 is generally the same as Example 2 with the tricarbamoyl triazine compound in place of the other polyisocyanate, and Example 4 illustrates the preparation of a clear coat containing a tricarbamoyl triazine compound in place of one half of the solid amount of a polyisocyanate.

The coating compositions of Examples 1 through 4 were prepared by mixing the ingredients together for each component in the order listed. A pigmented base coat, available from PPG Industries, Inc. as BWB8555, was spray applied in two coats with a 90 second flash between coats to electrocoated steel panels at room temperature (67° F., 19.4° C.) and at a relative humidity between 30 and 35 percent, to achieve a dry film thickness of 0.6 mil (15.2 microns). After applying the second coat, a 5 minute flash at 200° F. (93.3° C.) was allowed before application of the coating compositions of Examples 1 through 4. The respective components for each example were combined and the compositions were applied in two coats with a 90 second room temperature flash between coats, to achieve a dry film thickness of about 2 mil (50.8 microns). Each panel was given a 15 minute flash at room temperature and then cured for 30 minutes at 250° F. (121.1° C.).

Mar resistance of coated panels was measured using the following method: Gloss of coated panels is measured with a 20° BYK Gardner GLOSSGARD II Glossmeter, available from Gardner Instrument Co. Coated panels are marred by applying dry abrasive powder cleanser (Bon Ami™ cleanser, Faultless starch/Bon Ami Co.) followed by ten double rubs to the surface with a wool felt cloth using a Crockmeter mar tester (available from Atlas Electric Devices Company). The 20 degree gloss is read on the marred area of the panel after being washed with water and patted dry. The number reported is the percent gloss retention after marring, i.e., 100% x marred gloss/original gloss.

Acid resistance of coated panels was measured using the following method: Test panels were spotted with one drop each of 0.625N hydrochloric acid, 0.625N sulfuric acid, sulfuric acid solution at pH 2, and a sulfuric acid solution at pH 3. The panels, with drops uncovered, were then placed in electric ovens at 120° F. (48.8° C.) and one drop of each acid solution was added to the panels at ten minute intervals. After 30 minutes, the panels were removed from the ovens and were washed with soap and water and dried, then visually rated for degree of acid etch resistance.

Clear coat formulations and composite coating properties are reported in Table I below. Numbers in parentheses indicate percent solids by weight within the formulation.

TABLE I

| Example<br>Ingredient | 1<br>Wt. | 2<br>Wt. | 3<br>Wt. | 4<br>Wt. |
|---|---|---|---|---|
| Component A | | | | |
| Ethyl 3-ethoxypropionate | 53 | 30 | 42 | 48 |
| 1-Methoxy-2-propanol acetate | 28 | 22 | 18 | 31 |
| TINUVIN 900[1] | 2 (1.0) | 2 (1.0) | 2 (1.0) | 2 (1.0) |
| TINUVIN 328[2] | 5 (2.0) | 5 (2.0) | 5 (2.0) | 5 (2.0) |
| TINUVIN 292[3] | 3.7 (1.5) | 3.7 (1.5) | 3.7 (1.5) | 3.5 (1.5) |
| MULTIFLOW[4] | 1.0 (0.2) | 1.0 (0.2) | 1.0 (0.2) | 0.9 (0.2) |
| RK-5345[5] | 2.1 (0.5) | 2.1 (0.5) | 2.1 (0.5) | 2.2 (0.5) |
| Acrylic polyol[6] | 205 (56.7) | 234 (64.7) | 219 (60.6) | 208 (60.5) |
| Component B | | | | |
| Ethyl 3-ethoxypropionate | 12 | 23 | — | 23 |
| DESMODUR N-3390[7] | 51 (18.7) | 58 (21.3) | — | 52 (19.9) |
| DESMODUR Z-4370/2[8] | 87 (24.5) | — | 93 (26.2) | 44 (13.0) |
| Tricarbamoyl Triazine[9] | — | 69 (14.0) | 64 (13.1) | 31 (6.5) |
| Clear coat properties | | | | |
| Final Viscosity #4 Ford Cup | 23.0" | 25.1" | 24.4" | 25.7" |
| Composite properties | | | | |
| Mar Resistance | 22.8 | 49.9 | 43.7 | 43.6 |
| Acid Resistance | Good | Fair | Fair | Fair |

[1]2-(2'-Hydroxy-benzotriazole-2-yl)-4,6-bis(methyl-1-phenylethyl) phenol UV light stabilizer available from Ciba-Geigy Corp.
[2]2-(2'-Hydroxy-3',5'-ditert-amylphenyl) benzotriazole UV light stabilizer available from Ciba-Geigy Corp.
[3]Bis(1,2,2,6,6-pentamethyl-4-piperidinyl) sebacate UV light stabilizer available from Ciba-Geigy Corp.
[4]Copolymer of ethyl acrylate and 2-ethylhexyl acrylate in xylene, available from Monsanto Chemical Company.
[5]Flow additive available from E. I. DuPont De Nemours and Company, Inc.
[6]Copolymer comprising 40% hydroxypropyl acrylate, 20% styrene, 19% butyl acrylate, 18.5% butyl methacrylate, 2% acrylic acid, and 0.5% methyl methacrylate, having an equivalent weight of 325.
[7]Polyisocyanate of 1,6-hexamethylene diisocyanate, available from Bayer USA.
[8]Polyisocyanate of isophorone diisocyanate, available from Bayer USA.
[9]Compound having the formula $C_3N_3(NHCOOR)_3$, wherein R is a mixture of methyl and butyl groups.

The data in Table I indicates improvements in acid resistance and significant improvements in mar resistance of composite coatings wherein the clear coat is a multi-component polyisocyanate-polyol composition and contains a tricarbamoyl triazine as in the present invention.

EXAMPLES 5 AND 6

Examples 5 and 6 illustrate the preparation of various coating compositions in accordance with the present invention which are used in a color-plus-clear composite coating process. Example 5 is a control two-component clear coat containing polyepoxides and polyacid crosslinking agents. Example 6 illustrates the preparation of a clear coat containing a tricarbamoyl triazine compound in place of a portion of polyepoxide.

The coating compositions of Examples 5 and 6 were prepared and spray applied as in Examples 1 through 4 above. The composite coatings were cured and properties measured as in Examples 1 through 4 above.

Clear coat formulations and composite coating properties are reported in Table II below.

TABLE II

| Example<br>Material | 5<br>Wt. | 6<br>Wt. |
|---|---|---|
| Component A | | |
| Methyl isobutyl ketone | 13 | 13 |
| DOWANOL DPM[10] | 25 | 25 |
| Epoxy functional acrylic resin[11] | 128(29.0) | 75(16.9) |
| TINUVIN 328 | 7 (2.6) | 7 (2.6) |
| 3,4-Epoxy cyclohexyl methyl-3,4-epoxy cyclohexyl carboxylate | 75 (28.8) | 43 (16.9) |
| RK-5345 | 0.8 (0.33) | 0.8 (0.33) |
| TINUVIN 292 | 1.1 (0.25) | 1.1 (0.25) |
| MULTIFLOW | 1.3 (0.25) | 1.3 (0.25) |
| Tricarbamoyl Triazine | — | 98 (19.0) |
| Component B | | |
| Exxate 600 solvent[12] | 56 | 56 |
| Methyl isobutyl ketone | 42 | 42 |
| Acid functional polyester[13] | 78 (20.9) | 86 (23.3) |
| 1-octene/maleic anhydride copolymer[14] | 34 (9.6) | 38 (10.7) |
| Acid functional polyester[15] | 27 (8.2) | 30 (9.2) |
| Isostearic acid | 9 (3.4) | 10 (3.8) |
| Dodecyldimethyl amine | 11 (4.1) | 11 (4.1) |
| Clear coat properties | | |
| Final Viscosity #4 Ford Cup | 16.0" | 15.2" |
| Composite properties | | |
| Mar Resistance | 4.5 | 19.4 |
| Acid Resistance | Fair | Good |

[10]Dipropylene glycol monomethyl ether, available from Dow Chemical Co.
[11]Prepared according to U.S. Pat. No. 4,927,868, Example A.
[12]Acetate ester available from Exxon Chemicals America.
[13]Prepared according to U.S. Pat. No. 5,256,452, Example G.
[14]Prepared according to U.S. Pat. No. 4,927,868, Example F.
[15]Prepared according to U.S. Pat. No. 4,927,868, Example B.

The data in Table II indicates significant improvements in mar resistance and acid resistance of composite coatings wherein the clear coat is a multi-component polyepoxide-polyacid composition and contains a tricarbamoyl triazine, as in the present invention.

EXAMPLES 7 AND 8

Examples 7 and 8 illustrate the preparation of various coating compositions in accordance with the present invention which are used as monocoats. Example 7 is a control one-component coating composition containing a polyepoxide and a polyacid crosslinking agent, as well as an aminoplast. Example 8 illustrates the preparation of a coating composition containing a tricarbamoyl triazine compound in place of the aminoplast.

The coating compositions of Examples 7 and 8 were prepared by mixing the ingredients together in the order listed. The coating compositions were spray applied to electrocoated steel panels at room temperature (67° F., 19.4° C.) and at a relative humidity between 30 and 35 percent, to achieve a dry film thickness of 1.6 mil (40.6 microns). Each panel was given a 15 minute flash at room temperature and then cured for 25 minutes at 285° F. (140.5° C.)

The coating properties were measured as in Examples 1 through 4 above.

Formulations and coating properties are reported in Table III below.

TABLE III

| Example<br>Material | 7<br>Wt. | 8<br>Wt. |
|---|---|---|
| BUTYL CELLOSOLVE acetate[16] | 7 | 7 |
| AROMATIC 100 solvent[17] | 14 | 14 |
| Diethylene glycol monobutyl ether | 16 | 16 |
| TINUVIN 328 | 4 (2.1) | 4 (2.1) |
| Acrylic microgel[18] | 11 (2.8) | 11 (2.8) |
| RESIMENE HM-0610[19] | 17 (8.45) | — |
| Tricarbamoyl Triazine | — | 70 (20.1) |
| Acid functional polyester[20] | 71 (28.6) | 62 (24.7) |
| Epoxy functional acrylic[21] | 142 (46.7) | 122 (40.4) |
| MULTIFLOW | 0.7 (0.2) | 0.7 (0.2) |
| RK-5345 | 0.6 (0.2) | 0.6 (0.2) |
| Decanedioic acid | 0.7 (0.4) | 0.7 (0.4) |
| AEROSIL R812 silica dispersion[22] | 6 (1.8) | 6 (1.8) |
| Primary amyl alcohol | 8 | 8 |
| Carbon black dispersion[23] | 34 | 34 |
| 70:30 aromatic hydrocarbon:acetic acid (reducer) | 11 | — |
| Solvent Naphtha (reducer) | 7 | — |
| Coating properties | | |
| Final Viscosity #4 Ford Cup | 26.0" | 22.7" |
| Mar Resistance | 30.4 | 32.2 |
| Acid Resistance | Fair | Good |

[16]Acetic acid and 2-butoxyethyl ester, available from Union Carbide Chemicals and Plastics Co., Inc.
[17]Blend of aromatic solvents, also called SOLVESSO 100, available from Exxon Chemicals America.
[18]Prepared according to U.S. Pat. No. 4,147,688.
[19]Methylated melamine-formaldehyde resin available from Monsanto Chemical Co.
[20]Prepared according to U.S. Pat. No. 5,256,452, Example F.
[21]Prepared according to U.S. Pat. No. 5,256,452, Example B.
[22]Highly dispersed hydrophobic amorphous silicon dioxide available from Degussa Corporation.
[23]A dispersion of carbon in a 1:2 mixture of n-butyl acetate and an acrylic grind vehicle made up of about 29.9% styrene, 19.9% 2-ethyl hexyl acrylate, 19.4% butyl methacrylate, 17.9% methyl methacrylate, 10% hydroxyethyl acrylate, 1.9% methacrylic acid, 0.6% acrylic acid, and 0.4% propyleneimine; ground to a Hegman rating of 8+ and dispersed into a mixture of about 58% diisobutyl ketone and about 42% polyester polyol made up of about65% trimethyl pentanediol and 35% hexahydrophthalic anhydride to a final composition of 16.1% carbon, 68.8% acrylic grind vehicle, and 15.1% polyester polyol, having a solids content of about 63.9%.

The data in Table III indicates improvements in acid resistance of one-component polyacid-polyepoxide coatings which contain a tricarbamoyl triazine and are used as monocoats, as in the present invention.

EXAMPLES 9 AND 10

Examples 9 and 10 illustrate the preparation of various coating compositions in accordance with the present invention which are used in a color-plus-clear composite coating process. Example 9 is a control one-component clear coat containing a polyisocyanate and an acrylic polyol. Example 10 illustrates the preparation of a clear coat containing a tricarbamoyl triazine compound in place of a portion of polyisocyanate.

The coating compositions of Examples 9 and 10 were prepared and spray applied as in Examples 1 through 4 above. The composite coatings were cured for 30 minutes at 285° F. (140.5° C.) and properties measured as in Examples 1 through 4 above.

Clear coat formulations and composite coating properties are reported in Table IV below.

TABLE IV

| Example<br>Material | 9<br>Wt. | 10<br>Wt. |
|---|---|---|
| N-butyl acetate | 100 | 75 |
| TINUVIN 328 | 8 (2.65) | 8 (2.65) |
| BYK-301[24] | 0.6 (0.1) | 0.6 (0.1) |
| TINUVIN 292 | 1.0 (0.35) | 1.0 (0.35) |
| Acrylic polyol[25] | 225 (51.4) | 260 (59.4) |
| DESMODUR BL-3175A[26] | 208 (48.6) | 120 (28.0) |
| METACURE T-120[27] | 8 (0.5) | 0.8 (0.5) |
| Tricarbamoyl Triazine | — | 75 (12.6) |
| N-butyl acetate (reducer) | 160 | 134 |
| Clear coat properties | | |
| Final Viscosity #4 Ford Cup | 21.7" | 25.2" |
| Composite properties | | |
| Mar Resistance | 70.1 | 73.4 |
| Acid Resistance | Good | Good |

[24]Anti-mar additive available from BYK-Chemie USA.
[25]See footnote 6.
[26]1,6-hexamethylene diisocyanate capped with methyl ethyl ketoxime, available from Bayer USA.
[27]Butyltin mercaptide compound, available from Air Products and Chemicals, Inc.

The data in Table IV indicates an improvement in mar resistance of composite coatings wherein the clear coat is a one-component polyisocyanate-polyol composition and contains a tricarbamoyl triazine, as in the present invention.

EXAMPLES 11 AND 12

Examples 11 and 12 illustrate the preparation of various coating compositions in accordance with the present invention which are used in a color-plus-clear composite coating process. Example 11 is a control one-component clear coat containing a polyepoxide and polyacid crosslinking agent. Example 12 is the same as Example 11, further containing a tricarbamoyl triazine.

The coating compositions of Examples 11 and 12 were prepared and spray applied as in Examples 1 through 4 above, over a base coat available from PPG Industries, Inc., as NHU9517. Each panel was given a 15 minute flash at room temperature and then cured for 30 minutes at 285° F. (140.5° C.)

Clear coat formulations and composite coating properties are reported in Table V below.

TABLE V

| Example<br>Material | 11<br>Wt. | 12<br>Wt. |
|---|---|---|
| Ethyl 3-ethoxypropionate | 61 | 61 |
| TINUVIN 900 | 3 (1.3) | 3 (1.3) |
| TINUVIN 328 | 3 (1.4) | 3 (1.4) |

TABLE V-continued

| Example<br>Material | 11<br>Wt. | 12<br>Wt. |
|---|---|---|
| Ethyl ester of maleic anhydride octene copolymer[28] | 27 (8.6) | 27 (8.7) |
| Epoxy functional acrylic[29] | 117 (33.2) | 119 (33.7) |
| Epoxy functional acrylic[30] | 55 (18.4) | 56 (18.7) |
| Acid functional polyester[31] | 103 (33.2) | 105 (33.9) |
| n-Propanol | 8 | — |
| Primary amyl alcohol | 5 | — |
| R812 Silica dispersion | 41 (1.5) | 41 (1.5) |
| MULTIFLOW | 2.2 (0.5) | 2.2 (0.5) |
| Decanedioic acid | 2.2 (1.0) | 2.2 (1.0) |
| Tricarbamoyl triazine | — | 22 (5.0) |
| Xylene (reducer) | 13 | 33 |
| *Clear coat properties* | | |
| Final viscosity #4 Ford Cup | 24.9" | 23.8" |
| *Composite properties* | | |
| Mar Resistance | 14.0 | 40.7 |
| Acid Resistance | Good | Very Good |

[28] Prepared according to U.S. Pat. No. 5,256,452, Example J.
[29] Prepared according to U.S. Pat. No. 5,256,452, Example A.
[30] Prepared according to U.S. Pat. No. 5,256,452, Example E.
[31] Prepared according to U.S. Pat. No. 5,256,452, Example F.

The data in Table V indicates significant improvements in mar resistance and acid resistance of composite coatings wherein the clear coat is a one-component polyepoxide-polyacid composition and contains a tricarbamoyl triazine, as in the present invention.

We claim:

1. A curable composition comprising:
   (a) about 30 to 90 percent by weight, based on total weight of resin solids, of a film-forming composition comprising
      (i) an acrylosilane polymer, an acrylic polyol polymer, and optionally an alkylated melamine-formaldehyde crosslinking agent; and
   (b) about 10 to 70 percent by weight, based on total weight of resin solids, of a tricarbamoyl triazine compound of the formula: $C_3N_3(NHCOXR)_3$, wherein X is nitrogen, oxygen, sulfur, phosphorus, or carbon, and R is a lower alkyl group having 1 to 12 carbon atoms, or mixtures of lower alkyl groups.

2. The curable composition of claim 1 wherein the film-forming composition is a two-package composition.

3. The curable composition of claim 1 wherein the acrylosilane polymer is present in the film-forming composition of (i) in amounts of about 10 to 90 percent by weight based on total weight of resin solids in the film-forming composition of (i).

4. The curable composition of claim 1 wherein the acrylic polyol polymer is present in the film-forming composition of (i) in amounts of about 10 to 90 percent by weight based on total weight of resin solids in the film-forming composition of (i).

5. The curable composition of claim 1 wherein the alkylated melamine-formaldehyde crosslinking agent is present in the film-forming composition of (i) in amounts up to 50 percent by weight based on total weight of resin solids in the film-forming composition of (i).

6. The curable composition of claim 1 wherein the curable composition is a transparent top coat applied over a pigmented base coat in a color-plus-clear composite coating on a substrate.

7. The curable composition of claim 6 wherein the substrate has a primer-surfacer coating to which is applied the base coat.

8. The curable composition of claim 1 wherein the curable composition is a top coat applied over a primer-surfacer coating on a substrate.

9. The curable composition of claim 1 wherein X is oxygen.

10. The curable composition of claim 1 wherein R is a mixture of methyl and butyl groups.

11. Process for applying a composite coating to a substrate, comprising:
    applying a first curable coating selected from the group consisting of: primer surfacer and base coat coatings,
    applying a second coating over the first coat, where the second curable coating composition has:
       (a) about 30 to 90 percent by weight, based on total weight of resin solids, of a film-forming composition comprising
          (i) an acrylosilane polymer, an acrylic polyol polymer, and optionally an alkylated melamine-formaldehyde crosslinking agent; and
       (b) about 10 to 70 percent by weight, based on total weight of resin solids, of a tricarbamoyl triazine compound of the formula: $C_3N_3(NHCOXR)_3$, wherein X is nitrogen, oxygen, sulfur, phosphorus, or carbon, and R is a lower alkyl group having 1 to 12 carbon atoms, or mixtures of lower alkyl groups; and
    curing the composite coating.

12. The process of claim 11, wherein after applying the first coating which is a primer surfacer, the primer surfacer is cured before applying the second curable coating.

13. The process of claim 12, wherein applying the second coating is on the cured primer surfacer as a monocoat which optionally may contain pigmentation.

14. The process of claim 11, wherein after applying the first coating which is a curable base coat the second curable coating is applied as a wet-on-wet coating and both the base coat and the second coating are conjointly cured.

15. Coated article having a substrate with a first cured primer surfacer coating and a second cured coating, where the second cured coating is from the curable coating having
    (a) about 30 to 90 percent by weight, based on total weight of resin solids, of a film-forming composition comprising:
       (i) an acrylosilane polymer, an acrylic polyol polymer, and optionally an alkylated melamine-formaldehyde crosslinking agent; and
    (b) about 10 to 70 percent by weight, based on total weight of resin solids, of a tricarbamoyl triazine compound of the formula: $C_3N_3(NHCOXR)_3$, wherein X is nitrogen, oxygen, sulfur, phosphorus, or carbon, and R is a lower alkyl group having 1 to 12 carbon atoms, or mixtures of lower alkyl groups.

16. Coated article having a substrate with a first curable coating which is a base coat having thereon a curable clear coat having:
    (a) about 30 to 90 percent by weight, based on total weight of resin solids, of a film-forming composition comprising:
       (i) an acrylosilane polymer, an acrylic polyol polymer, and optionally an alkylated melamine-formaldehyde crosslinking agent; and
    (b) about 10 to 70 percent by weight, based on total weight of resin solids, of a tricarbamoyl triazine compound of the formula: $C_3N_3(NHCOXR)_3$, wherein X is nitrogen, oxygen, sulfur, phosphorus, or carbon, and R is a lower alkyl group having 1 to 12 carbon atoms, or mixtures of lower alkyl groups.

\* \* \* \* \*